Dec. 1, 1925.

R. E. MARBURY 1,563,426

CONDENSER FOR POWER FACTOR CORRECTION

Filed Oct. 7, 1921      2 Sheets-Sheet 1

WITNESSES:

INVENTOR
Ralph E. Marbury.
BY
ATTORNEY

Dec. 1, 1925.            R. E. MARBURY            1,563,426
CONDENSER FOR POWER FACTOR CORRECTION
Filed Oct. 7, 1921            2 Sheets-Sheet 2
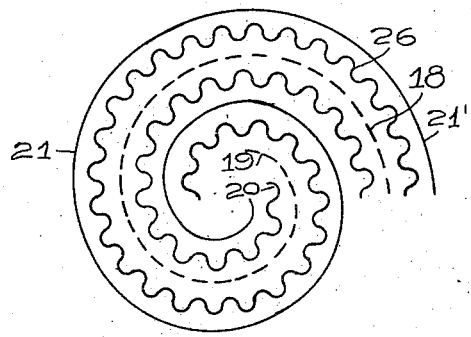
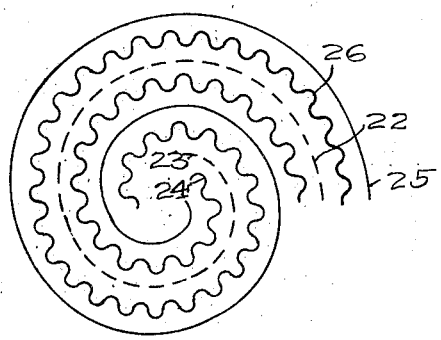
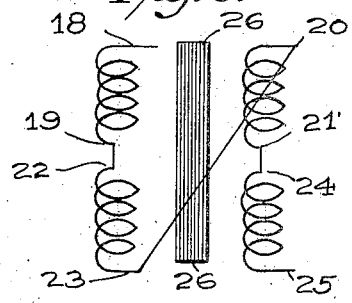
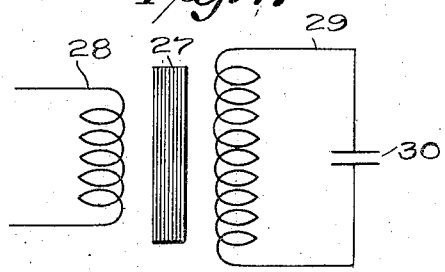
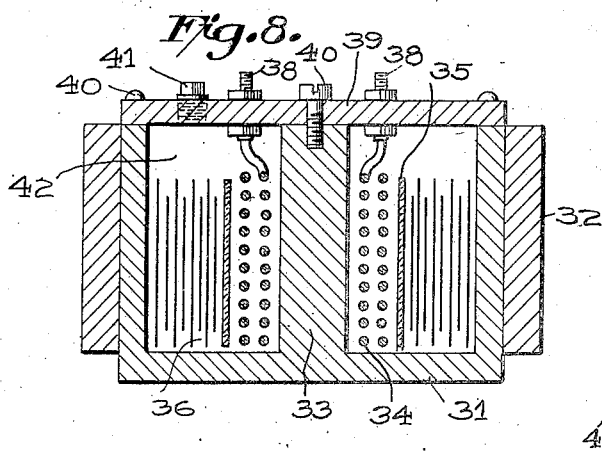
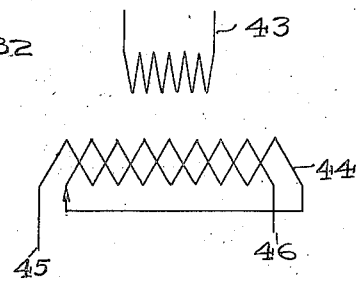
WITNESSES:
INVENTOR
Ralph E. Marbury
BY
ATTORNEY Patented Dec. 1, 1925.

1,563,426

UNITED STATES PATENT OFFICE.

RALPH E. MARBURY, OF WILKINSBURG, PENNSYLVANIA, ASSIGNOR TO WESTINGHOUSE ELECTRIC & MANUFACTURING COMPANY, A CORPORATION OF PENNSYLVANIA.

CONDENSER FOR POWER-FACTOR CORRECTION.

Application filed October 7, 1921. Serial No. 506,171.

*To all whom it may concern:*

Be it known that I, RALPH E. MARBURY, a citizen of the United States, and a resident of Wilkinsburg, in the county of Allegheny and State of Pennsylvania, have invented a new and useful Improvement in Condensers for Power-Factor Correction, of which the following is a specification.

My invention relates to electrical transformers, more especially to transformers that will serve as power-factor correction devices for low-voltage application.

Low power factor in an electrical power circuit is due to high inductive loads, such as induction coils or induction motors or other apparatus having inductance when connected in an alternating-current circuit.

It is well known that a condenser connected in such a circuit will correct the power factor because of its distributive capacity or condensive reactance. Oil-impregnated paper dielectric condensers have been commonly employed in this capacity and have been designed for various voltages within certain limits. A condenser is known to be inefficient for low-voltage work because of the improper working of the dielectric element and is also limited to only moderately high voltages because of corona.

It has been found that condensers may be designed for voltages ranging between 1000 and 1500 volts and it has been customary, for this reason, to use a transformer in combination with a condenser to provide the proper low operating voltage.

My invention provides a device combining the functions of regulating the voltage and providing condensive reactance for power-factor correction, and it is among the objects thereof to provide such apparatus which shall be of unitary construction, which shall be compact, which shall be electrically efficient in its operation, and which shall be simple to construct and less expensive than apparatus heretofore employed.

It is a further object of this invention to provide a structure for condensive reactance for power-factor correction which may be designed for any voltage and which may be a part of a standard distributing transformer.

It is a still further object of this invention to provide a condenser winding for a standard distributing transformer which shall be adapted to correct for the magnetizing current of the transformer iron.

In practicing my invention, I provide a standard laminated-iron transformer core having a standard primary winding, and, in place of the secondary winding, I provide a condenser structure consisting of a plurality of wound strips of metal foil having a suitable dielectric material disposed therebetween and usually having the ends of the strips cross-connected for a purpose to be hereinafter set forth. The assembled structure is preferably disposed in a leakproof tank and immersed in a suitable insulating oil.

In the accompanying drawings constituting a part hereof and in which like reference characters indicate like parts, Figure 1 is a top plan view of a transformer made in accordance with this invention;

Figs. 4 and 5 are diagrammatic views of condenser elements wound in accordance with this invention;

Fig. 6 is a diagrammatic view of the windings of Figs. 4 and 5 showing a method of connection to maintain desirable voltage gradation across the insulation;

Fig. 7 is a diagrammatic view of a standard transformer having a condenser connected in series with the secondary windings thereof;

Fig. 8 is a cross-sectional view of a modification of the transformer shown in Fig. 1; and Fig. 9 is a diagrammatic view of the primary and secondary windings of the transformer shown in Fig. 8, illustrating a slightly modified form of my invention.

Figure 1:
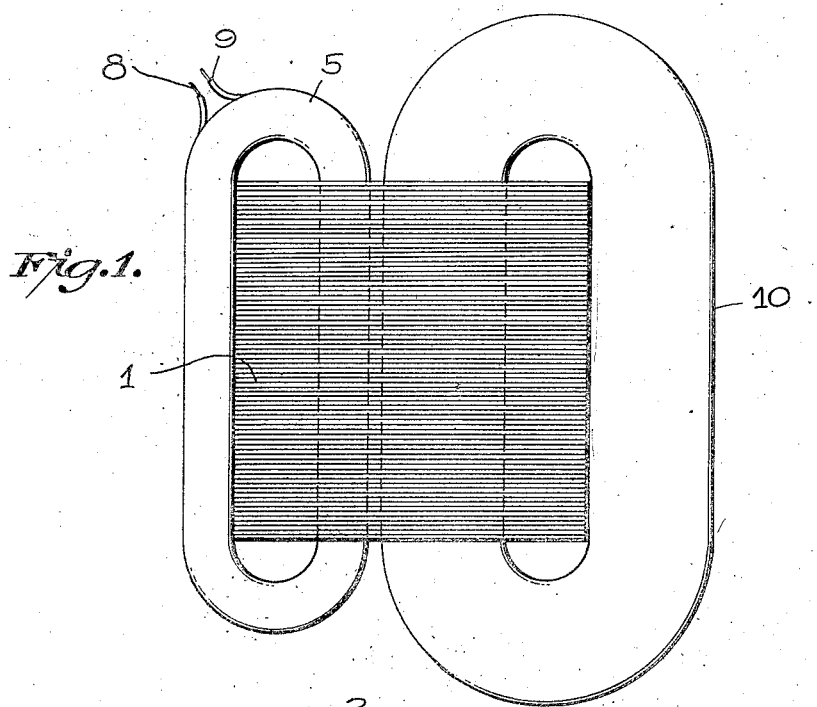
Figure 2:
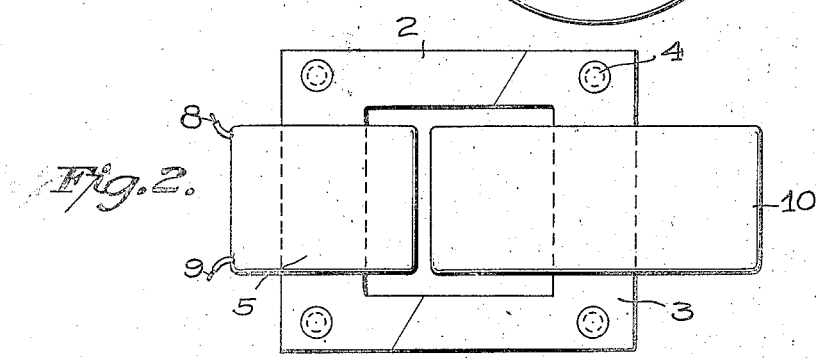
Fig. 2 is a view, in side elevation, thereof.
Figure 3:
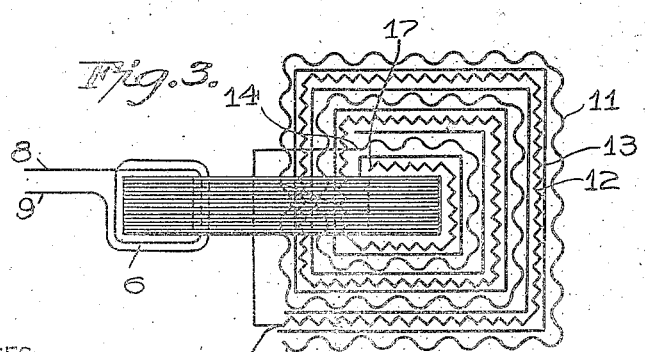
Fig. 3 is a diagrammatic view showing the relation of primary and secondary windings.

I provide an iron core 1 formed of a plurality of superposed layers 2, 3 and the like of iron laminations which are assembled and secured by suitable bolts 4. A primary winding 5, consisting of a plurality of convolutions 6 of copper wire having terminals 8 and 9, is disposed around one leg of the core 1. A secondary winding 10, comprising a plurality of conductor strips 11 and 12 having dielectric material 13 disposed therebetween, is spirally wound around the core 1 in suitable relation to the primary windings 5. One end 14 of the strip 11 is connected to the opposite end 15 of the strip 12. By connecting the windings in this manner, the voltage across the dielectric material is increased, to permit working the dielectric material harder and to greater advantage.

This type of construction may be designed to obtain any one of the following characteristics. The voltage is dependent upon the number of turns that may be wound within a given space. The electrostatic capacity is dependent upon the width of turn and the average length per turn. The kva capacity of the condenser element is dependent upon the thickness of the metal strip or conductor members and the efficiency of the structure is dependent upon the voltage available for working the dielectric material.

It is obvious that, if a given iron core is assumed and a given kva capacity is wanted within a limited space, it will be difficult to get enough turns to work the dielectric or insulation hard enough and still have sufficient current capacity. To overcome this difficulty and to obtain reasonable working of the insulation of dielectric material for voltage efficiency, the windings are formed and connected as shown in Figs. 4, 5 and 6 in which the conductor members 18 and 21 having a sheet of dielectric 26 disposed therebetween are formed into a plurality of superposed convolutions.

Condenser elements (Fig. 5) consisting of conductor members 22 and 25 having dielectric 26 disposed therebetween are formed in a similar manner and a plurality of such windings are connected, as shown diagrammatically in Fig. 6, the ends 19 and 22, 23 and 20, and 21 and 24 being connected in series across the dielectric 26. The voltage across the dielectric material is equivalent to the sum of the voltages in the windings 18 and 22, and 21 and 25. Assuming that the voltage in each winding is 500 volts, then the voltage across the insulation or dielectric 26 will be 1000 volts and the sum of the currents flowing in each parallel coil at any point in the condenser is equal to the current in the connection between the windings 23 and 20.

Any number of sections may be interconnected in this manner to obtain the most efficient design for the required purpose. This depends upon the application, the amount of winding space, the kva capacity desired and the thickness of the conductor material used. The conductor material may consist of tin foil, copper or other suitable material and the dielectric may be the ordinary wax paper, mica-sheet material or other materials having suitable dielectric properties.

Condensers of this construction are particularly suitable for low-voltage power-factor correction where it is undesirable to build condensers for line voltage. It has the advantage of a variable condensive reactance inasmuch as a dial switch may be provided on the primary winding to take care of the difference in line voltage or to give varying amounts of condensive load to correct for different power factors when the line or load changes. Condensers of this type may be disposed in the ordinary transformer tanks and be impregnated with suitable insulating oil.

Where power-factor correction is desired for low-voltage windings, as in telephone work, and where the potential used is as low as 30 volts, a device of this type may be applied to replace the customary transformer and condenser units which were connected up in a manner shown in Fig. 7 in which a standard transformer consisting of an iron core 27, primary winding 28 and secondary winding 29 were connected in series with a condenser 30.

In accordance with this invention, I may provide a structure particularly suited for such work which consists of a circular iron tank 31 having radiating fins 32, or other external cooling means such as cooling coils for water or oil, formed around its outer periphery and having an iron core member 33 centrally disposed therein. A primary winding 34, consisting of a plurality of spirally wound superposed convolutions of copper wire, is disposed around the core member 33, and an insulating sleeve 35 is inserted around the winding 34. A condenser winding 36, consisting of a plurality of strips of suitable metal foil having dielectric material disposed therebetween, is wound around the insulating sleeve 35 to form a secondary winding.

The primary winding 34 is provided with a pair of terminals 38 mounted on the cover 39 which is secured to the tank 31 by screws 40. A sealing plug 41 is inserted in the cover 39 and provides an opening to the chamber 42 for establishing communication between said chamber and a source of vacuum. When the elements are assembled in the container and the cover is secured thereto, the chamber 42 is evacuated and then filled with a suitable insulating oil.

The relation of the primary and secondary windings is graphically shown in Fig. 9 in which the primary is represented by the windings 43 and the secondary by the windings 44 which consists of two strips of foil interconnected to work the insulation or dielectric material therebetween.

It will be readily seen that this construction provides ready accessibility to the windings in case of breakdown, as it is but necessary to remove the cover and lift out the windings.

Where the above described apparatus is employed for power-factor correction, the primary windings are shunt connected across the line, and the free ends 45 and 46 of the condenser windings 44 (Fig. 9) are not connected in the circuit.

In some instances, however, where a number of distributing transformers are connected in a transmission circuit, it is desirable to employ a condenser connected across the secondary windings (Fig. 7) to correct by capacity current for the wattless magnetizing current of the transformer core. This magnetizing current or lagging component is practically independent of the load current and is, therefore, in existence when the transformer is idle on the line. A condenser winding, such as herein described, may be connected across the terminals 45 and 46, in place of the secondary winding of a distributing transformer, to a load to function as a standard distributing transformer.

When the transformer is idle, the capacity current of the secondary or condenser winding will correct for the wattless magnetizing current of the transformer core. The condenser windings, as in the power-factor-correction device, may be designed for an average-load wattless component by varying the number of turns, thickness and width of the conductor element and the kind of dielectric used.

From the above description of my invention, it will be readily understood that a transformer construction of this type provides a practical means for power-factor correction of power circuits in that they may be designed to accommodate almost any voltage available within certain wide limits. The construction, as illustrated, is economical to manufacture, and the compactness of the apparatus which constitutes a complete unit materially reduces the cost below that of the combination of apparatus heretofore employed.

Although I have described my invention generally, it will be apparent that there is a large number of specific applications to which the principles set forth may be applied.

Although I have described a specific embodiment of my invention, it will be obvious to those skilled in the art that various modifications may be made in the details of construction thereof, as, for instance, the primary and secondary windings may be disposed within the core instead of around it. The secondary windings may be inter-connected to obtain various combinations, the dielectric material may consist of any suitable material and paraffin or similar material may be substituted for the impregnating oil.

The construction shown in Fig. 8 may be modified in various ways. For instance, the core member may be separate from the tank proper and disposed therein in any suitable position, the radiating fins of the tank may be omitted and a water or oil cooling system may be applied thereto. These and other changes in construction may be made within the scope of the appended claims.

I claim as my invention:

1. In a power-factor-correction device, an iron core and primary and secondary windings thereon, said secondary winding comprising a pair of superposed layers of conducting sheet material having dielectric material disposed therebetween and a permanent connection connecting the outer end of one of said conducting layers to the inner end of the other.

2. In a power-factor-correction device, an iron core and primary and secondary windings thereon, said secondary winding comprising a plurality of pairs of superposed layers of conducting sheet material having dielectric material disposed therebetween, the outer end of one conducting layer of one pair being connected to the inner end of one conducting layer of another pair, and so on, until a series is produced including one conducting layer from each of the pairs, the other conducting layers of the pairs being similarly connected in a second series, and the outer end of one series being connected to the inner end of the other series.

3. In a power-factor-correction device, an iron core and a winding thereon, said winding comprising a plurality of pairs of superposed layers of conducting sheet material having dielectric material disposed therebetween, the outer end of one conducting layer of one pair being connected to the inner end of one conducting layer of another pair, and so on, until a series is produced including one conducting layer from each of the pairs, the other conducting layers of the pairs being similarly connected in a second series, and the outer end of one series being connected to the inner end of the other series.

In testimony whereof I have hereunto subscribed my name this first day of October 1921.

RALPH E. MARBURY.